US008386089B2

(12) United States Patent
Ögren

(10) Patent No.: US 8,386,089 B2
(45) Date of Patent: Feb. 26, 2013

(54) METHOD FOR TELEOPERATING AN UNMANNED GROUND VEHICLE WITH A PAN CAMERA AND SUCH A GROUND VEHICLE

(75) Inventor: Petter Ögren, Sundbyberg (SE)

(73) Assignee: TotalFörsvarets Forskningsinstitut, Stockholm (SE)

( * ) Notice: Subject to any disclaimer, the term of this patent is extended or adjusted under 35 U.S.C. 154(b) by 783 days.

(21) Appl. No.: 12/223,924

(22) PCT Filed: Feb. 12, 2007

(86) PCT No.: PCT/SE2007/000121
§ 371 (c)(1),
(2), (4) Date: Oct. 28, 2009

(87) PCT Pub. No.: WO2007/094714
PCT Pub. Date: Aug. 23, 2007

(65) Prior Publication Data
US 2010/0138079 A1      Jun. 3, 2010

(30) Foreign Application Priority Data
Feb. 17, 2006   (SE) ...................................... 0600352

(51) Int. Cl.
*G05D 1/02* (2006.01)
*G06F 19/00* (2006.01)
(52) U.S. Cl. .............................. 701/2; 348/114; 348/118
(58) Field of Classification Search .................. None
See application file for complete search history.

(56) References Cited

U.S. PATENT DOCUMENTS

| 5,648,897 A | * | 7/1997 | Johnson et al. ................. 700/83 |
| 2003/0216834 A1 | | 11/2003 | Allard |
| 2004/0101161 A1 | | 5/2004 | Roh et al. |
| 2006/0013469 A1 | * | 1/2006 | Wang et al. ................... 382/153 |

FOREIGN PATENT DOCUMENTS

| JP | 11 320467 A | | 11/1999 |
| JP | 2002-154383 | * | 5/2002 |

OTHER PUBLICATIONS

Hughes et al.; Task-Driven Camera Operations for Robotic Exploration; Systems, Man and Cybernetics, Part A: Systems and Humans; IEEE; vol. 35, No. 4, pp. 513-522; Jul. 2005.*
Hughes et al.; Camera Control and Decoupled Motion for Teleoperation; Systems, Man and Cybernetics, 2003; IEEE; vol. 2; pp. 1339-1344; Oct. 2002.*

* cited by examiner

*Primary Examiner* — Michael J. Zanelli
(74) *Attorney, Agent, or Firm* — Jacobson Holman PLLC

(57) ABSTRACT

A method is provided for teleoperating an unmanned ground vehicle having a control unit, a first drive unit, a second drive unit and a pan camera, arranged in front of or behind the nominal center of rotation (z) of the vehicle. The operator controls the translation and rotation of the camera, and thus his field of vision, relative to a camera-fixed coordinate system, and the movement of the vehicle is calculated to perform this camera movement. Consequently, the operator can in most cases ignore the vehicle dynamics and experience the feeling of controlling a floating camera. An unmanned ground vehicle with a control unit which performs the method is also provided.

17 Claims, 3 Drawing Sheets

Fig. 4
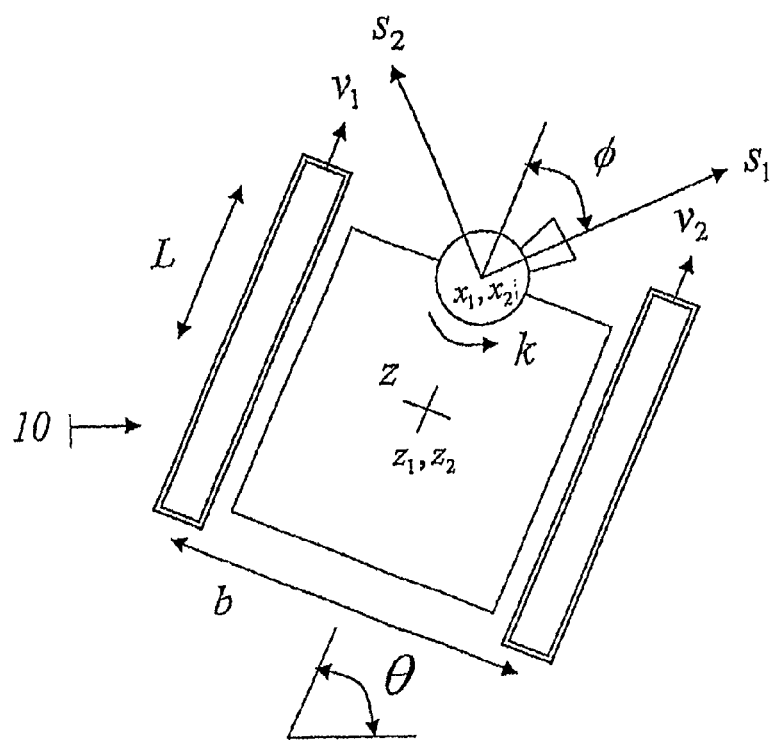
Fig. 1
(Prior Art)
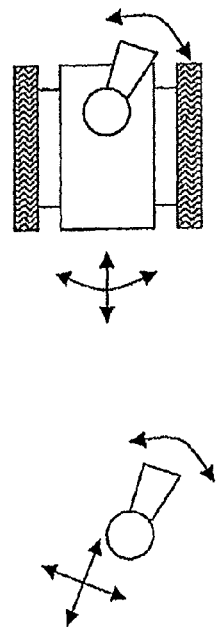
Fig. 2

METHOD FOR TELEOPERATING AN UNMANNED GROUND VEHICLE WITH A PAN CAMERA AND SUCH A GROUND VEHICLE

This is a national stage of PCT/SE2007/000121 filed Feb. 12, 2007 and published in English.

BACKGROUND OF THE INVENTION

1. Field of the Invention

The invention relates to a method of teleoperating an unmanned ground vehicle with a pan camera, and such a ground vehicle.

2. Description of the Related Art

Unmanned ground vehicles (UGVs) are used to an increasing extent both for non-military and military purposes. Such a vehicle has a pan camera mounted on it which transmits images to an operator. The images are used for reconnaissance purposes and to help the operator orient himself and be able to teleoperate the vehicle. The operator watches the images on a display and operates the vehicle using a control unit. The control unit has a joystick with which the operator steers the vehicle forward/backward and right/left. Moreover there is an additional joystick with which the operator steers the camera up/down/right/left relative to the vehicle.

A common method of teleoperating an unmanned vehicle is the case where the operator controls, with one joystick of the control unit, the movements of the vehicle in space and, with the other joystick, the movement of the camera relative to the vehicle. The drawback of this method is that an experienced operator is required to steer both the vehicle and the camera at the same time, especially in high stress situations. This drawback is due to the fact that the operator must take into consideration the orientation of the camera, the orientation of the vehicle and also the difference between them when the vehicle is to be operated.

SUMMARY OF THE INVENTION

The present invention eliminates this drawback by providing a method of teleoperating an unmanned ground vehicle having a control unit, a first drive unit, a second drive unit and a pan camera, arranged in front of or behind the nominal centre of rotation (z) of the vehicle. The method includes the steps of an operator controlling the rotation of the camera decoupled from the vehicle rotation and controlling the motion of the vehicle in each time instant based upon an orientation of the camera so that what is seen in the centre of the camera image is reached by a command to move the vehicle; the control unit calculating, based upon a command signal for the movement of the vehicle, a first and a second control signal to the respective drive units that will move the vehicle according to the command signal, and a third control signal to the camera counter-acting the movement of the vehicle so that the orientation of the camera is not affected by the movement of the vehicle.

BRIEF DESCRIPTION OF THE DRAWINGS

The invention will in the following be described in more detail with reference to the following figures:

FIG. 1 illustrates operating of a ground vehicle according to prior art technique.

FIG. 2 illustrates operating of a ground vehicle according to the invention.

FIG. 4 illustrates operating of a ground vehicle by way of example.

DETAILED DESCRIPTION OF THE PREFERRED EMBODIMENTS

Figure 3:
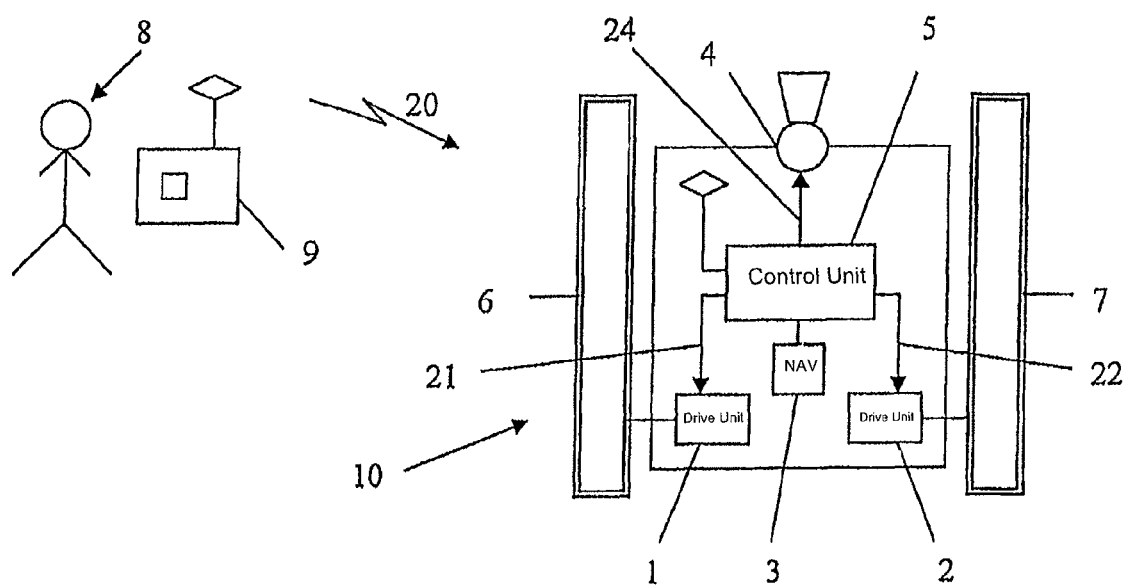
FIG. 3 illustrates a ground vehicle according to the invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

The invention relates to a method of teleoperating an unmanned ground vehicle with a pan camera, for instance a tracked UGV (Unmanned Ground Vehicle) or a wheeled UGV, and a ground vehicle using this method.

With a wheeled vehicle, a UGV of a "wheelchair configuration" is suitably used. By wheelchair configuration is meant the wheel configuration that is used in many UGVs and almost all wheelchairs, for instance Nomadic Scout and Permobil C300CS. In this configuration, the tracks are replaced by two drive wheels with a fixed direction relative to the vehicle. The drive wheels, which can also be more than two, are supplemented with one or more support wheels with a pivot function, that is they can freely rotate about their vertical axis and thus be oriented in different directions relative to the vehicle. On a classic wheelchair, the drive wheels are large and driven manually and the support wheels are small and positioned at the front. A tracked vehicle and a vehicle of wheelchair configuration are very similar from a control point of view. They can both turn on the spot and are controlled by the speeds of the drive wheels/tracks or the forces applied thereto.

Prior art unmanned ground vehicles are operated by an operator via a control panel controlling the movement of the vehicle relative to an earth-fixed coordinate system and the movements of the camera relative to a vehicle-fixed coordinate system, see FIG. 1. It can be difficult and time consuming for the operator to keep in mind how the camera, that is the field of vision of the operator, is oriented relative to the vehicle in order to know how the vehicle is to be operated relative to the field of view.

The invention, however, proposes a method and a vehicle which eliminates this drawback. The operator controls the camera, and thus his field of vision, in the usual way but when the operator wants to control also the vehicle (forward-backward, right-left), also this control is given relative to the camera, see FIG. 2.

Here a simple example is shown as to how the difference between an ordinary UGV and a vehicle according to the invention works. The operator drives the vehicle straight on, stops and turns the camera to the right. On his control panel, the operator now sees the same image as the camera "sees". With the previous way of operating the ground vehicle, the operator would now, to be able to continue to move in the camera direction, have to turn the vehicle to the right, compensate for this movement by turning the camera back in the opposite direction and only after that drive the vehicle straight on.

With the invention, this complicated way of operating is not necessary. When the operator has driven the vehicle straight on, stopped and turned the camera to the right, the starting position is the same. When the operator wants to continue to drive the vehicle in the camera direction, the operator signals that the vehicle is to be driven straight on. The signal is transmitted to the vehicle which converts the operators' signal and, inter alia, the camera position relative to the vehicle into a first and a second control signal to the two drive units which turn the vehicle to the right and drive straight on. At the same time, also a third control signal is transmitted to the camera, which is turned in the opposite direction to maintain its orientation relative to an earth-fixed coordinate system. As a result, the camera moves along a straight line, straight on toward the object that is positioned in the centre of the camera image. Consequently, the operator can in most cases ignore the vehicle dynamics and experience the feeling of controlling a floating camera.

Technically, an ordinary UGV has five degrees of freedom, 2 for position, 1 for the orientation of the vehicle, and 2 for the orientation of the camera. A floating camera has four degrees of freedom, 2 for position and 2 for orientation. The method of teleoperating according to the invention ignores the orientation of the vehicle. By placing the camera in front of or behind the nominal centre of rotation of the vehicle (see below) and use, for example, feed-back linearisation, it is possible to let the user control precisely the movement and orientation of the camera; these commands are converted in real time into control signals for the two drive units and the pan-tilt function of the camera which controls that the total camera movement will be the desired one. An important difference is that in the naive interface of an ordinary UGV, for operating both vehicle and camera, the operating is relative to a vehicle-fixed coordinate system. The invention, however, is controlled relative to a camera-fixed coordinate system. This difference is achieved by a coordinate change in combination with the operating algorithms that will be described below.

FIG. 3 illustrates a vehicle (10) according to the invention. The vehicle (10) comprises a control unit (5) which can receive signals for teleoperation from an operator (8), a first drive unit (1) comprising a motor and tracks (6) or wheels, a second drive unit (2) also comprising a motor and tracks (7) or wheels, a pan camera (4) and a navigation sensor (3) which detects the orientation of the vehicle, for instance an IMU (Inertial Measurement Unit). The control unit (5) receives a signal (20) for teleoperating from the operator (8) via a control panel (9). The signal (20) is processed in the control unit (5) and a first control signal (21) is transmitted to the first drive unit (1), a second control signal (22) is transmitted to the second drive unit (2) and a third control signal (24) is transmitted to the camera (4). The control signals to the drive units contain information on the velocity ($v_1$, $v_2$) or force ($F_1$, $F_2$) that is to be performed by the drive units (1, 2). The control signal (24) to the camera contains information on the angular velocity (k) which is to be performed by the camera.

The vehicle has a nominal centre of rotation (z), that is the point or vertical axis around which the vehicle rotates if the tracks/drive wheels have the same velocity but opposite directions. However, the momentary centre of rotation may vary, especially in uneven terrain. This is compensated for by the centre of rotation being estimated and the operating being adjusted, preferably by the vehicle having a navigation sensor (3) which detects the movements of the vehicle and can transmit correction signals to the control unit (5) for compensation. For example, if one track/drive wheel stands in mud and the other on grass, the friction will be different and initially the vehicle will not move as required by the operator, but the control unit must compensate for the differences in friction by way of new control signals to the drive units and the camera.

The camera (4) is placed in front of or behind a line extending through the nominal centre of rotation (z) which is perpendicular to the tracks/drive wheels, suitably more than ⅓ of the distance forward to the leading edge and, respectively, backward to the trailing edge.

With the method according to the invention, the zero dynamics cannot be controlled, that is the angle between vehicle and camera cannot be controlled. A normal pan-tilt unit has angular restrictions, for instance +/− 130 degrees. In the end positions, it is therefore necessary to make deviations from the purely camera-centred control behaviour, or alternatively use a camera mounting without angular restrictions.

The method of teleoperating an unmanned ground vehicle (10) according to the invention comprises a vehicle (10) comprising a first drive unit (1), a second drive unit (2), and a pan camera (4). The camera (4) is arranged in front of or behind a line extending through the nominal centre of rotation (z) of the vehicle. The operator controls the translation and rotation of the camera, and thus his field of vision, relative to a camera-fixed coordinate system, and the movement of the vehicle is calculated to perform a camera movement relative to a coordinate system fixed to the camera (4).

Below follow two embodiments of how a method of teleoperating according to the invention can be carried out. In the embodiments, the vehicle is exemplified as a tracked vehicle. However, it is also possible to use the invention together with wheeled vehicles, preferably vehicles of wheel-chair configuration as described above. If the vehicle is a car-type vehicle, it is not possible to completely hide the dynamics of the vehicle, which results in, for example, the camera sometimes following the vehicle in an "overshoot" before the camera is in the correct position. Except for this, the method is also well suited for car-type vehicles.

One embodiment of the invention involves teleoperating the vehicle according to the method below. The method is described with reference to FIG. 4. In this embodiment, the speed of the drive units, tracks or wheels is controlled.

Example 1

An example of a method of teleoperating an unmanned ground vehicle (10) comprising a first drive unit (1), a second drive unit (2), a pan camera (4), arranged in front or behind a line extending through the nominal centre of rotation (z) of the vehicle, a control unit (5) which receives a signal (20) from an operator (8) and transmits a first and a second control signal (21, 22) to the respective drive units (1, 2) and a third control signal (24) to the camera (4).

The signal (20) from the operator (8) contains information on the speed ($s_1$, $s_2$) and the angular velocity ($s_\omega$) of the camera (4) which the operator wants to perform. The signal (20) containing, inter alia, the information ($s_1$, $s_2$, $s_\omega$) is received by the vehicle and transmitted to the control unit (5). The control unit (5) calculates the speed that the first and the second drive unit (1, 2) must have and also the angular velocity of the camera relative to the vehicle to perform the movement desired by the operator. The control unit then transmits, in real time, control signals (21, 22) containing information on the velocity ($v_1$, $v_2$) of the first and second drive units (1, 2) and information on the angular velocity (k) of the camera (4) relative to the vehicle.

The calculation of the speeds is made by the control unit as stated below. The model used to describe the vehicle and the position and orientation of the camera is:

$$\begin{pmatrix} \dot{z}_1 \\ \dot{z}_2 \\ \dot{\theta} \\ \dot{\phi} \end{pmatrix} = \begin{pmatrix} \frac{v_1 + v_2}{2} \cos\theta \\ \frac{v_1 + v_2}{2} \sin\theta \\ \frac{v_1 - v_2}{b} \\ k \end{pmatrix}$$

where $z_1$, $z_2$ is the point around which the vehicle rotates if the tracks move at the same speed in different directions, that is the nominal centre of rotation z of the vehicle, $\theta$ is the orientation of the vehicle relative to an earth-fixed coordinate system, $v_1$, $v_2$ and the speed of the respective tracks/drive wheels, b is the distance between the tracks/drive wheels, $\phi$ the angle of the camera relative to the vehicle and k the angular velocity of the camera relative to the vehicle.

The common operating method now involves controlling the tracks/drive wheels using one joystick and the angular velocity of the camera relative to the vehicle using another joystick. Since the invention wants to provide a method of operating which is easier for the operator, the model will be developed.

Let the position of the camera be $x_1$, $x_2$, a distance L in front of z. Then $$x_1 = z_1 + L \cos\theta$$

$$x_2 = z_2 + L \sin\theta$$

The development of this position over time can then be formulated as follows $$\begin{pmatrix} \dot{x}_1 \\ \dot{x}_2 \end{pmatrix} = \begin{pmatrix} \cos\theta & -\sin\theta \\ \sin\theta & \cos\theta \end{pmatrix} \begin{pmatrix} 1/2 & 1/2 \\ L/b & -L/b \end{pmatrix} \begin{pmatrix} v_1 \\ v_2 \end{pmatrix} = \begin{pmatrix} u_1 \\ u_2 \end{pmatrix}$$

where u is the desired speed of the camera in an earth-fixed coordinate system. It should be noted that both matrices are always invertible if $L/b \neq 0$.

If the operator now wants a given speed of the camera $s_1$, $s_2$ and a given angular velocity $s_\omega$ of the camera, all relative to a camera-fixed coordinate system, the velocities $v_1$, $v_2$ and k can be computed as follows:

$$\begin{pmatrix} v_1 \\ v_2 \end{pmatrix} = \begin{pmatrix} 1/2 & 1/2 \\ L/b & -L/b \end{pmatrix}^{-1} \begin{pmatrix} \cos\theta & -\sin\theta \\ \sin\theta & \cos\theta \end{pmatrix} \begin{pmatrix} s_1 \\ s_2 \end{pmatrix}$$

$$k = s_\omega - \dot{\theta} = s_\omega - \frac{v_1 - v_2}{b}$$

since $$\begin{pmatrix} u_1 \\ u_2 \end{pmatrix} = \begin{pmatrix} \cos(\theta + \phi) & -\sin(\theta + \phi) \\ \sin(\theta + \phi) & \cos(\theta + \phi) \end{pmatrix} \begin{pmatrix} s_1 \\ s_2 \end{pmatrix}$$

The calculated ($v_1$, $v_2$, k) are now transmitted to the respective drive units and the camera.

If, for example, the operator wants to drive straight toward the object he sees in the centre of the camera image, he presses one joystick forward; the signal ($s_1 = 1$, $s_2 = 0$, $s_\omega = 0$) is now transmitted to the control unit which calculates the ($v_1$, $v_2$, k) which cause the vehicle and the camera to move together so that the camera approaches the object in the centre of the image along a straight line, all the time directed toward the same object, independently of the orientation of the vehicle relative to the camera.

Example 2

A second embodiment of the invention involves operating the vehicle as will be described below. The embodiment will be described with reference to FIG. 4. In this embodiment, the force is controlled by the drive units.

The method of teleoperating an unmanned ground vehicle (10) comprising a first drive unit (1), a second drive unit (2), a pan camera (4), arranged in front or behind a line extending through the nominal centre of rotation (z) of the vehicle, a control unit (5) which receives a signal (20) from an operator (8) and transmits a first and a second control signal (21, 22) to the respective drive units (1, 2) and a third control signal (24) to the camera (4).

The signal (20) from the operator (8) contains information on the acceleration ($s_1$, $s_2$) and the angular velocity ($s_\omega$) of the camera (4) which the operator wants to perform. The signal (20) containing, inter alia, the information ($s_1$, $s_2$, $s_\omega$) is received by the vehicle and transmitted to the control unit (5). The control unit (5) calculates the force ($F_1$, $F_2$) which the respective drive units are to generate on the ground to perform the movement desired by the operator. The control unit then transmits, in real time, control signals (21, 22) which contain information on the force ($F_1$, $F_2$) for the respective first and second drive units (1, 2) and information on the angular velocity k of the camera (4) relative to the vehicle.

The calculation of force and angular velocity by the control unit occurs as will be described below. The model of describing the position and orientation of the vehicle and the camera is a development of the one in Example 1. A second order vehicle model can then be formulated, for example, as:

$$\begin{pmatrix} \dot{z}_1 \\ \dot{z}_2 \\ \dot{\theta} \end{pmatrix} = \begin{pmatrix} v\cos\theta \\ v\sin\theta \\ \omega \end{pmatrix}$$

$$\begin{pmatrix} \dot{v} \\ \dot{\omega} \\ \dot{\phi} \end{pmatrix} = \begin{pmatrix} F/m \\ \tau/J \\ k \end{pmatrix}$$

where $z_1$, $z_2$ and $\theta$ are as stated above, v is the velocity of the vehicle, $\omega$ is the angular velocity, F is the force generated by the tracks/wheels on the ground, m is the mass of the vehicle, r is the torque generated by the tracks, J is the moment of inertia, a and k are the same as in Example 1.

If the camera is positioned at a distance L from z and the operator wants a given acceleration of the position $s_1$, $s_2$ of the camera and a given angular velocity $s_\omega$ of the camera, all relative to a camera-fixed coordinate system, the force F and the moment of inertia $\tau$ and k are obtained from the following equations:

$$\begin{pmatrix} F/m \\ \tau L/J \end{pmatrix} = \begin{pmatrix} L\omega^2 \\ -v\omega \end{pmatrix} + \begin{pmatrix} \cos\phi & -\sin\phi \\ \sin\phi & \cos\phi \end{pmatrix} \begin{pmatrix} s_1 \\ s_2 \end{pmatrix}$$

$$k = s_\omega - \dot{\theta} = s_\omega - \omega$$

Then the control unit calculates the force that is to be generated by the respective drive units. These forces are obtained from the total force and the moment of inertia according to the equation:

$$\begin{pmatrix} F_1 \\ F_2 \end{pmatrix} = \begin{pmatrix} 1/2 & 1/b \\ 1/2 & -1/b \end{pmatrix} \begin{pmatrix} F \\ \tau \end{pmatrix}$$

where $F_1$ is the force exerted on tracks/drive wheels of the first drive unit and $F_2$ is the force exerted on tracks/drive wheels of the second drive unit.

Figure 5:
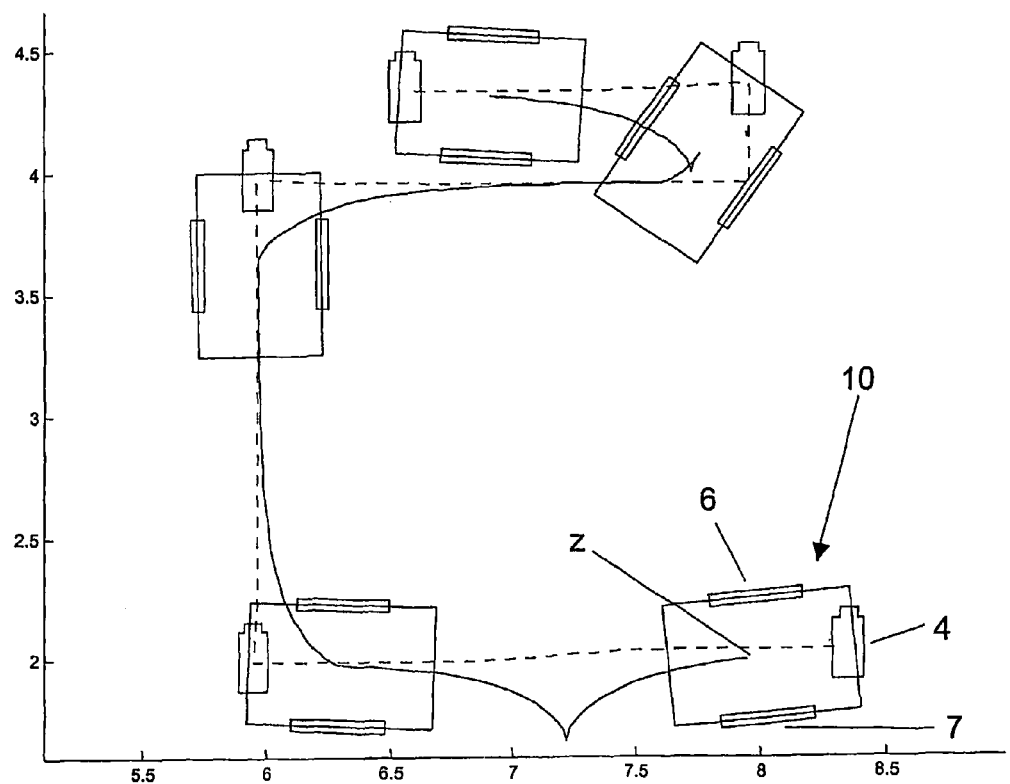
FIG. 5 illustrates a control sequence with an unmanned ground vehicle according to the invention.

Finally a control sequence with an unmanned ground vehicle (10) according to the invention is illustrated in FIG. 5, which shows the vehicle and the camera (4) at five different points of time. In addition to these five instantaneous images, the figure shows the change of the nominal centre of rotation (z) of the vehicle as a solid line and the change of the position of the camera (4) as a dashed line.

When the sequence starts, the vehicle stands in position (8, 2) oriented east-north-east and the camera is oriented north (upward). The operator now commands a movement (translation) straight to the left relative to a camera-fixed coordinate system. To achieve this camera movement, the vehicle is forced to first reverse and slowly turn to the left, subsequently stop and then drive forward, all the time while rotating to the left. It is evident that the movement of the vehicle results in the camera (4) moving along a straight line, as desired by the operator. Since the operator has not commanded any rotation of the camera, the camera has all the time been oriented north. To achieve this, the motor rotating the camera has all the time compensated for the rotation of the vehicle.

Close to (6, 2) the operator stops the vehicle and commands a movement forward relative to the camera. Again, the solid curve (the nominal centre of rotation of the vehicle) describes a more complicated shape than the dashed curve (the position of the camera), and again the motor moving the camera must compensate for the rotation of the vehicle. The continued process illustrates that the operator first commands a movement to the right, then slightly forward and finally to the left again, all relative to a camera-fixed coordinate system. It should be noted that in this way the operator need not worry about the direction in which the vehicle (10) is oriented, but only the direction in which the camera (4) is oriented, and this is exactly what the operator sees in the camera image.

The invention gives the operator an interface which resembles an abstraction of the movement and visual impressions of a human. As a result, the vehicle can be driven more safely and faster, the training times are shortened and fewer mistakes occur, above all under stress.

The invention also concerns an unmanned ground vehicle comprising a control unit (5) which uses one of the operating methods as stated above.

The invention being thus described, it will be apparent that the same may be varied in many ways. Such variations are not to be regarded as a departure from the spirit and scope of the invention, and all such modifications as would be recognized by one skilled in the art are intended to be included within the scope of the following claims.

The invention claimed is:

1. A method of teleoperating an unmanned ground vehicle having a control unit, a first drive unit, a second drive unit and a pan camera, arranged in front of or behind the nominal centre of rotation (z) of the vehicle, the method comprising the steps of:
an operator controlling the rotation of the camera decoupled from the vehicle rotation and controlling the motion of the vehicle in each time instant based upon an orientation of the camera so that what is seen in the centre of the camera image is reached by a command to move the vehicle, and
said control unit calculating, based upon a command signal for the movement of the vehicle, a first and a second control signal to the respective drive units that will move the vehicle according to the command signal, and a third control signal to the camera counter-acting the movement of the vehicle so that the orientation of the camera is not affected by the movement of the vehicle, said command signal including information on speed ($s_1$, $s_2$) and the angular velocity ($s_\omega$) of the camera relative to a camera-fixed coordinate system;
calculating the velocity of the first and the second drive unit by the control unit as follows:

$$\begin{pmatrix} v_1 \\ v_2 \end{pmatrix} = \begin{pmatrix} 1/2 & 1/2 \\ L/b & -L/b \end{pmatrix}^{-1} \begin{pmatrix} \cos\phi & -\sin\phi \\ \sin\phi & \cos\phi \end{pmatrix} \begin{pmatrix} s_1 \\ s_2 \end{pmatrix}$$

where b is the distance between the drive units, L is the distance from the nominal centre of rotation z to the camera and $\phi$ the angle of the camera relative to the vehicle;
calculating the angular velocity of the camera relative to the vehicle by the control unit as follows:

$$k = s_\omega - \dot{\theta} = s_\omega - \frac{v_1 - v_2}{b}$$

where $\theta$ is the orientation of the vehicle relative to an earth-fixed coordinate system;
the first and the second control signal containing information on the velocity ($v_1$, $v_2$) of the respective drive units; the third control signal containing information on the angular velocity (k) of the camera relative to the vehicle.

2. The method as claimed in claim 1, wherein the first and the second drive unit include tracks.

3. The method as claimed in claim 1, wherein the first and the second drive unit each include one or more drive wheels.

4. The method as claimed in claim 1, wherein the vehicle includes a navigation sensor that measures the movement of the vehicle and compares said movement with the control signals of the operator and transmits correction signals to the control unit to compensate for differences.

5. The method as claimed in claim 1, wherein the ratio L/b is greater than ⅓, where b is the distance between the drive units, L is the distance from the nominal centre of rotation (z) to the camera.

6. The method as set forth in claim 1, wherein the vehicle includes a navigation sensor that measures the movement of the vehicle and compares said movement with the control signals of the operator and transmits correction signals to the control unit to compensate for differences.

7. The method as set forth in claim 1, wherein the ratio L/b is greater than ⅓, where b is the distance between the drive units, L is the distance from the nominal centre of rotation (z) to the camera.

8. A method of teleoperating an unmanned ground vehicle having a control unit, a first drive unit, a second drive unit and a pan camera, arranged in front of or behind the nominal centre of rotation (z) of the vehicle, said method comprising the steps of:
an operator controlling the rotation of the camera decoupled from the vehicle rotation and controlling the motion of the vehicle in each time instant based upon an orientation of the camera so that what is seen in the centre of the camera image is reached by a command to move the vehicle;

said control unit calculating, based upon a command signal for the movement of the vehicle, a first and a second control signal to the respective drive units that will move the vehicle according to the command signal, and a third control signal to the camera counter-acting the movement of the vehicle so that the orientation of the camera is not affected by the movement of the vehicle;

said control signal containing information on acceleration ($s_1$, $s_2$) and the angular velocity ($s_\omega$) of the camera relative to a camera-fixed coordinate system;

calculating the force and the torque of the first and the second drive unit as follows:

$$\begin{pmatrix} F/m \\ \tau L/J \end{pmatrix} = \begin{pmatrix} L\omega^2 \\ -v\omega \end{pmatrix} + \begin{pmatrix} \cos\phi & -\sin\phi \\ \sin\phi & \cos\phi \end{pmatrix} \begin{pmatrix} s_1 \\ s_2 \end{pmatrix}$$

where v is the velocity of the vehicle, ω is the angular velocity of the vehicle, F is the force generated by the drive units on the ground, m is the mass of the vehicle, τ is the torque generated by the drive units, L is the distance from the nominal centre of the rotation (z) to the camera, J is the moment of inertia, φ the angle of the camera relative to the vehicle;

calculating, by the control unit, the force of the first and the second drive unit as follows:

$$\begin{pmatrix} F_1 \\ F_2 \end{pmatrix} = \begin{pmatrix} 1/2 & 1/b \\ 1/2 & -1/b \end{pmatrix} \begin{pmatrix} F \\ \tau \end{pmatrix}$$

where $F_1$ is the force exerted on tracks/drive wheels of the first drive unit and $F_2$ is the force exerted on tracks/drive wheels of the second drive unit;

calculating the angular velocity of the camera relative to the vehicle as follows:

$$k = s - \dot{\theta} = s_\omega - \omega$$

where θ is the orientation of the vehicle relative to an earth-fixed coordinate system;

the first and the second control signal containing information on force ($F_1$, $F_2$) of the respective drive units; and the third control signal containing information on angular velocity (k) of the camera relative to the vehicle.

9. The method as claimed in claim 8, wherein the first and the second drive unit include tracks.

10. The method as claimed in claim 8, wherein the first and the second drive unit each include one or more drive wheels.

11. A method of teleoperating an unmanned ground vehicle having a navigation sensor, a first drive unit, a second drive unit, a control unit and a pan camera, arranged in front of or behind the nominal centre of rotation (z) of the vehicle, said method comprising the steps of:

an operator controlling the rotation of the camera decoupled from the vehicle rotation and controlling the motion of the vehicle in each time instant based upon an orientation of the camera so that what is seen in the centre of the camera image is reached by a command to move the vehicle;

said control unit calculating, based upon a command signal for the movement of the vehicle, a first and a second control signal to the respective drive units that will move the vehicle according to the command signal, and a third control signal to the camera counter-acting the movement of the vehicle so that the orientation of the camera is not affected by the movement of the vehicle;

said navigation sensor measuring the movement of the vehicle and comparing said movement with the control signals of the operator and transmitting correction signals to the control unit to compensate for differences.

12. An unmanned ground vehicle comprising a first drive unit, a second drive unit, and a pan camera, arranged in front of or behind the nominal centre of rotation (z) of the vehicle, an operator controlling the rotation of the camera decoupled from the vehicle rotation and controlling the motion of the vehicle in each time instant based upon an orientation of the camera so that what is seen in the centre of the camera image is reached by a command to move the vehicle;

said vehicle further including a control unit which, based upon a command signal for the movement of the vehicle, calculates a first and a second control signal to the respective drive units that will move the vehicle according to the command signal, and a third control signal to the camera that counter-acts the movement of the vehicle so that the orientation of the camera is not affected by the movement of the vehicle; and said vehicle further including a navigation sensor that measures the movement of the vehicle and compares said movement with the control signals of the operator and transmits correction signals to the control unit to compensate for differences.

13. The unmanned ground vehicle as claimed in claim 12, wherein the first and the second drive unit include tracks.

14. The unmanned ground vehicle as claimed in claim 12, wherein the first and the second drive unit each include one or more drive wheels.

15. The unmanned ground vehicle as claimed in claim 12, wherein the command signal includes information on speed ($s_1$, $s_2$) and the angular velocity ($s_\omega$) of the camera relative to a camera-fixed coordinate system;

the velocity of the first and the second drive unit is calculated by the control unit as follows:

$$\begin{pmatrix} v_1 \\ v_2 \end{pmatrix} = \begin{pmatrix} 1/2 & 1/2 \\ L/b & -L/b \end{pmatrix}^{-1} \begin{pmatrix} \cos\phi & -\sin\phi \\ \sin\phi & \cos\phi \end{pmatrix} \begin{pmatrix} s_1 \\ s_2 \end{pmatrix}$$

where b is the distance between the drive units, L is the distance from the nominal centre of rotation z to the camera and φ the angle of the camera relative to the vehicle;

the angular velocity of the camera relative to the vehicle is calculated by the control unit as follows:

$$k = s_\omega - \dot{\theta} = s_\omega - \frac{v_1 - v_2}{b}$$

where θ is the orientation of the vehicle relative to an earth-fixed coordinate system;

the first and the second control signal contain information on the velocity ($v_1$, $v_2$) of the respective drive units; and the third control signal contains information on the angular velocity (k) of the camera relative to the vehicle.

16. The unmanned ground vehicle as claimed in claim 15, wherein the ratio L/b is greater than ⅓, where b is the distance between the drive units, L is the distance from the nominal centre of rotation (z) to the camera.

17. The unmanned ground vehicle as set forth in claim 12, wherein the command signal contains information on acceleration ($s_1$, $s_2$) and the angular velocity ($s_\omega$) of the camera relative to a camera-fixed coordinate system;

the force and the torque of the first and the second drive unit are calculated as follows:

$$\begin{pmatrix} F/m \\ \tau L/J \end{pmatrix} = \begin{pmatrix} L\omega^2 \\ -v\omega \end{pmatrix} + \begin{pmatrix} \cos\phi & -\sin\phi \\ \sin\phi & \cos\phi \end{pmatrix} \begin{pmatrix} s_1 \\ s_2 \end{pmatrix}$$

where v is the velocity of the vehicle, $\omega$ is the angular velocity of the vehicle, F is the force generated by the drive units on the ground, m is the mass of the vehicle, $\tau$ is the torque generated by the drive units, L is the distance from the nominal centre of the rotation (z) to the camera, J is the moment of inertia, $\phi$ the angle of the camera relative to the vehicle;

the force of the first and the second drive unit is calculated by the control unit as follows:

$$\begin{pmatrix} F_1 \\ F_2 \end{pmatrix} = \begin{pmatrix} 1/2 & 1/b \\ 1/2 & -1/b \end{pmatrix} \begin{pmatrix} F \\ \tau \end{pmatrix}$$

where $F_1$ is the force exerted on tracks/drive wheels of the first drive unit and $F_2$ is the force exerted on tracks/drive wheels of the second drive unit;

the angular velocity of the camera relative to the vehicle is calculated as follows:

$$k = s - \dot{\theta} = s_\omega - \omega$$

where $\theta$ is the orientation of the vehicle relative to an earth-fixed coordinate system;

the first and the second control signal contain information on force ($F_1$, $F_2$) of the respective drive units; and the third control signal contains information on angular velocity (k) of the camera relative to the vehicle.

* * * * *